June 26, 1962 J. R. OISHEI 3,040,358
WINDSHIELD CLEANER
Filed March 27, 1957 3 Sheets-Sheet 1

INVENTOR.
JOHN R. OISHEI
BY
Bean Brooks Buckley + Bean.
ATTORNEYS

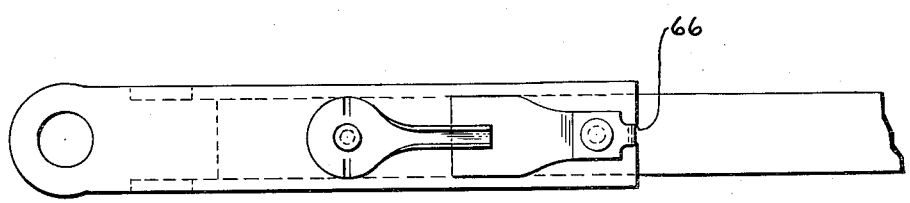
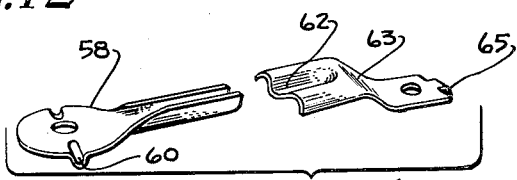
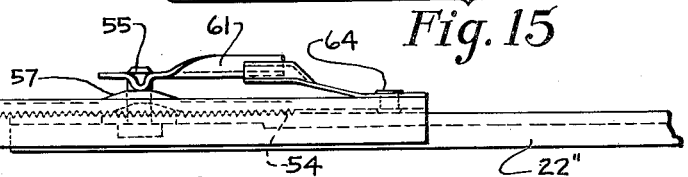
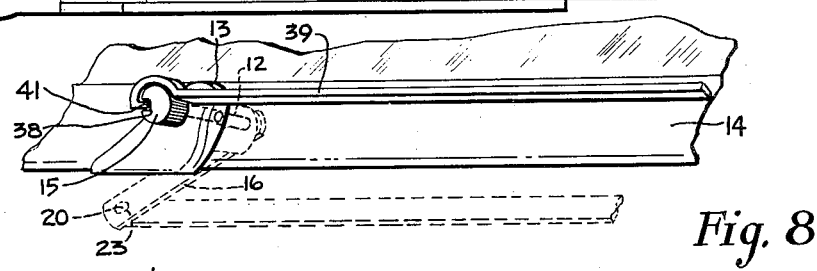
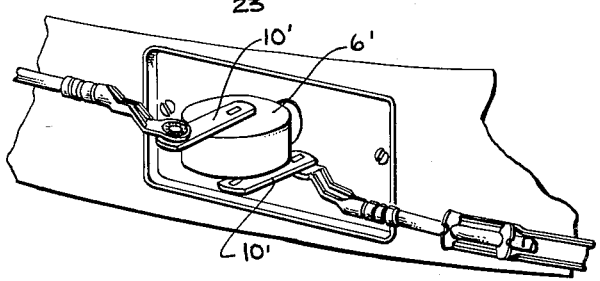
INVENTOR.
JOHN R. OISHEI
BY
Bean Brooks Buckley + Bean
ATTORNEYS June 26, 1962  J. R. OISHEI  3,040,358
WINDSHIELD CLEANER Filed March 27, 1957  3 Sheets-Sheet 3

INVENTOR.
JOHN R. OISHEI
BY
Bean Brooks Buckley + Bean
ATTORNEYS

United States Patent Office 3,040,358
Patented June 26, 1962

3,040,358
WINDSHIELD CLEANER
John R. Oishei, Buffalo, N.Y., assignor to Trico Products Corporation, Buffalo, N.Y.
Filed Mar. 27, 1957, Ser. No. 648,806
8 Claims. (Cl. 15—250.27)

This invention relates generally to the windshield wiper art, and more specifically to a new and useful windshield wiper rigid transmission linkage having means to compensate for misalignment of the motor drive shaft and wiper pivot shaft centers.

Windshield wiper systems of this type customarily comprise one or more pivot shafts each adapted to support a wiper arm for oscillation across the surface to be wiped and having a crank arm movable therewith, a drive motor having a drive shaft and one or more drive arms movable therewith, and rigid connecting rods or links pivotally connected at one end to the motor drive arms and at their other ends to the pivot shaft crank arms.

Each such system is dimensionally designed to meet the requirements of the particular vehicle for which it is intended. To this end the drive arms, crank arms and connecting rods all are fabricated to standard length, and the correct relative positional alinement of pivot centers of the drive and pivot shafts must be uniform in car body structure to produce the desired degree of wiper travel with a given wiper linkage. Each of the located mounting centers is critical, and when variation occurs in any one of them without means for compensating for variation, the linkage will not provide the desired wiping pattern or action which it is designed to produce.

For example, if the linkage is installed with the mounting spacing between its drive shaft and driven pivot shaft centers other than that for which the linkage is designed, the degree of angular travel of each wiper will be affected.

There is no problem in the manufacture of drive arms, crank arms and connecting rods of the correct length. However, with modern vehicle fabricating and assembly methods it is very difficult, if not impossible as a practical matter, to maintain the proper relative positional spacing of the drive and pivot shaft centers. This occurs because the cowl member through which the pivot shafts extend comprises a body part fabricated separately from the body part on which the drive motor is mounted, the respective body parts being welded or otherwise secured either to each other or to one or more intermediate body parts. The locating openings for the wiper pivot shafts and the motor are perforated in the individual unassembled body parts, whereby producing an accurate spacing between the respective shaft centers in car body production is a practical impossibility.

Dimensional differences of this nature were not too serious in windshield cleaner installations for wiping flat windshields where a slight increase in the amount of the wiper travel on a flat surface was not serious.

For flat windshield installations to assure proper alignment many linkage sets were mounted on a single bracket with the motor, as a unitized set. However, flat windshields have been supplanted by curved surfaces, and more recently by the so called Panoramic windshield characterized by receding lateral portions joined to a frontal portion by sharply curved corner portions.

The position of the wiper arm on the rockshaft is necessarily determined with the wiper in its parked position so that the blade will lie along the cowl of the windshield. The outboard blade function fixes its running travel. Any inaccuracies of pivot centers which result in a running travel beyond that for which the system is designed will, therefore, result in a movement of the blade outwardly beyond a position considered safe against scuffing the glass. In order to avoid hazards of this kind, flexible cable transmissons which compensate for pivot center differentiations have heretofore been used.

Accordingly, it is a primary object of this invention to provide a windshield wiper system having a rigid transmission linkage with readily adjustable means to compensate for mis-spacing of the wiper motor and pivot shaft centers.

Rigid linkage transmission is generally used in combination with the rotary motions of the electric windshield wiper type, where the rigid links are used to convert the rotary action into the motion of oscillation for swinging the wiper blades. The adjustable linkage is of particular advantage in such combinations where the adjustment of the length of the connecting rod to the distance between the driving and driven crank pins is a vital element in maintaining control of the wiping pattern.

A windshield wiper system constructed in accord with this invention is characterized by the provision, in combination with a drive shaft and a drive arm connected to the drive shaft for movement therewith, a pivot shaft adapted to support a wiper for oscillation over the surface to be wiped, and a crank arm connected to the pivot shaft for rotation therewith, of a length adjustable connecting rod adapted for connection adjacent its opposite ends to the drive and crank arms and having means for maintaining the adjusted length of the rod, whereby the length of the connecting rod can be adjusted as necessary to compensate for a variation in the spacing between the drive and pivot shaft centers.

The method of installing a windshield cleaner in accord with this invention is characterized by first moving the drive arm and the driven arm to a predetermined relative position, then adjusting the length of the connecting rod to the distance between the driving and driven crank pins so that it will match the distance between the driving and driven pivot shafts.

The foregoing and other objects, advantages and characterizing features of a windshield cleaner and method of installing the same, in accord with this invention, will become clearly apparent from the ensuing detailed description taken together with the accompanying drawings forming a part thereof wherein like reference numerals denote like parts throughout the various views and wherein:

FIG. 8 is a schematic view illustrating one step in the installation of the cleaner on a vehicle;

FIG. 9 is a perspective view showing the transmission links connected to another type of drive motor;

FIG. 12 is a fragmentary top plan view of still another form of connecting link;

FIG. 13 is a side elevational view thereof;

FIG. 14 is a bottom plan view thereof;

FIG. 15 is an exploded perspective view of the locking latch mechanism thereof;

Figure 1:
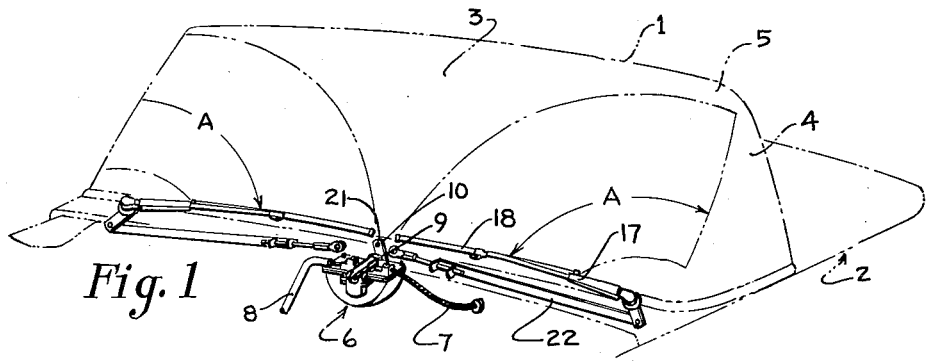
FIG. 1 is a perspective view of a windshield cleaner in accord with the invention as it appears during installation on a vehicle.
Figures 2, 3, 4:
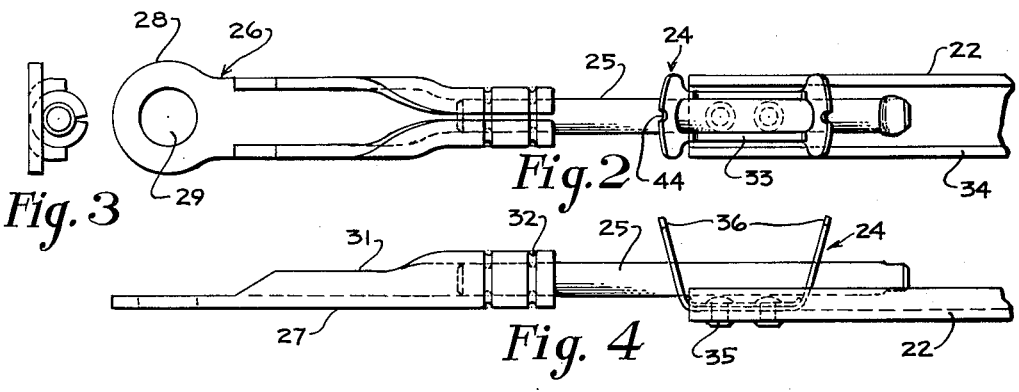
FIG. 2 is a fragmentary top plan view of one form of connecting rod transmission link, with its locking clutch engaged.
FIG. 3 is an end view thereof.
FIG. 4 is a side elevational view thereof.
Figures 5, 6, 7:
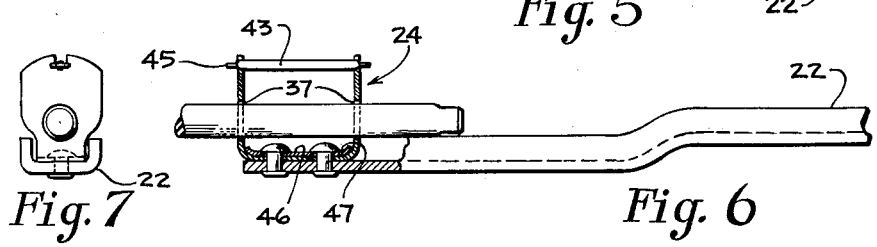
FIG. 5 is a fragmentary top plan view showing the locking clutch device thereof in disengaged position.
FIG. 6 is a side elevational view thereof.
FIG. 7 is an end elevational view thereof.

Referring now to that embodiment of the invention which is illustrated in FIGS. 1–9, the same comprises a windshield cleaner adapted for use with the windshield, generally designated 1, of a vehicle 2. Windshield 1 is shown to be of the panoramic type, having a frontal area 3 which is relatively flat and which is joined to receding lateral areas 4 through crest portions 5 of relatively sharp curvature at the opposite corners thereof.

The cleaner is driven by a conventional motor 6 which in the case of FIG. 1 is shown as being a vacuum motor controlled as through a Bowden wire 7 and powered from a suitable suction source such as the intake manifold of vehicle 2, not illustrated, through a conduit 8. Motor 6 drives a shaft 9 carrying diametrically opposed drive arms 10.

A pair of pivot shafts 12 is supported in housings 13 mounted on the vehicle cowl 14 (FIG. 8) adjacent the corner crest portions 5 of windshield 1, and carry at one end a drive burr 15 and at their other end a crank arm 16, both of which are fixed thereto for rotation therewith. Drive burrs 15 in turn are adapted to receive wiper actuating arms 17 carrying wipers 18 of known type. Crank arms 16 each carry a pivot pin 20, and drive arms 10 each carry a pivot pin 21, for connection to a rigid connecting rod for completing a rigid push-pull transmission linkage translating motion of the motor drive shaft 9 into oscillation of wipers 18.

In order to produce, on windshield 1 the correct wiping pattern A for which the cleaner is designed, it is essential not only that the drive arms and crank arms be of the correct length but also that they occupy the correct predetermined relative position at all times. This in turn necessitates correct spacing of the centers of drive shaft 9 and pivot shafts 12, because if they are mis-spaced the rigid link used to connect the drive arms to the crank arms would cause a change in the relative position thereof and would thereby cause the wipers 18 to depart from the correct predetermined angular wiper travel A.

As a practical matter, the requisite spacing of the shaft centers can not be provided. Accordingly in a rigid transmission type of cleaner constructed in accord with this invention provision is made to selectively adjust the length of the connecting rods to compensate for body dimensional variations in the shaft centers by correspondingly varying the distance between the points 20, 21 of pivotal connection to the drive and crank arms, whereby the correct angular relation between the arms is maintained at all times.

Figure 16:
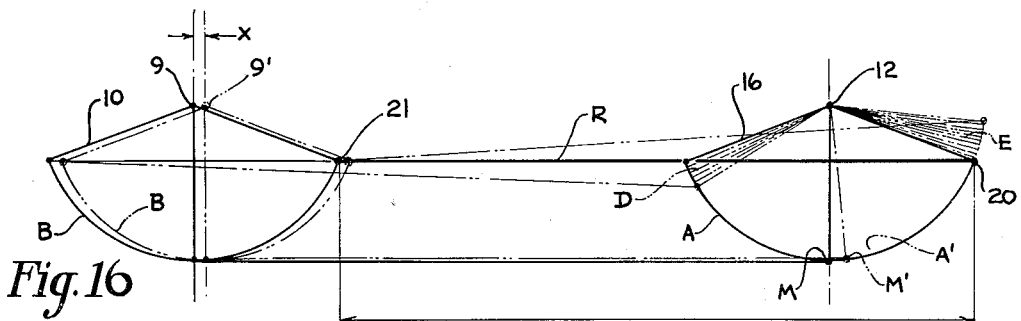
FIG. 16 is a schematic view illustrating the change in transmitted movement which occurs when the length of the connecting rod is out of agreement with the distance between the pivot centers.
Figure 17:
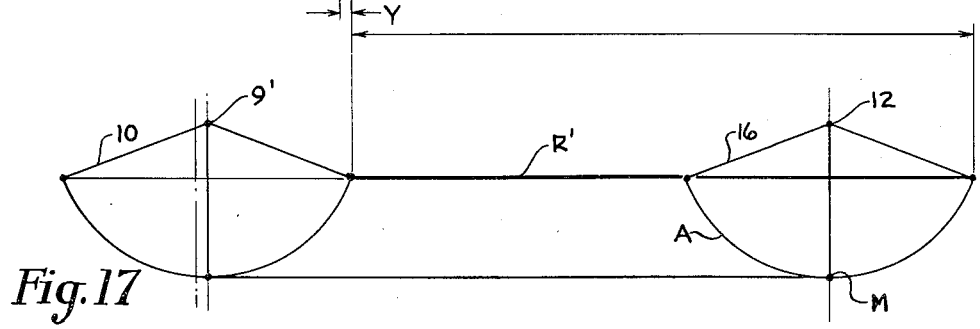
FIG. 17 is a view similar to FIG. 16, but with the length of the connecting rod adjusted to match the spacing between pivot centers.
Figure 18:
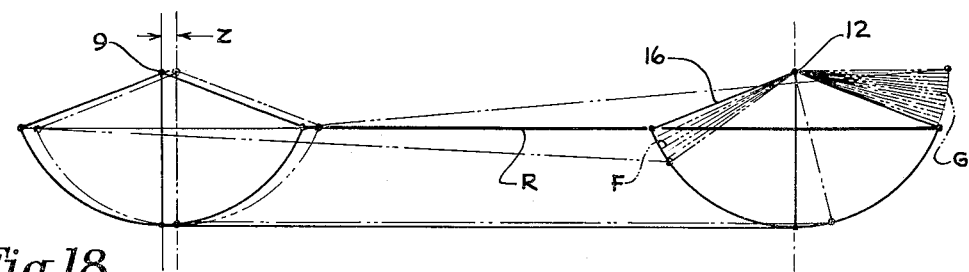
FIG. 18 is a view similar to FIG. 16, illustrating how the transmission moves into a dead center position and locks itself against movement when the length of the connecting rod is too far out of agreement with the spacing between the pivot centers.

To illustrate the foregoing, reference is made to FIGS. 16–18 which illustrate the results of mis-spacing of the pivot shaft centers, both when uncompensated for and when compensated for by adjusting the length of the connecting rod. Thus, FIG. 16 shows in full lines the pattern of oscillation of a drive arm 10 and of its connected crank arm 16 about their centers of oscillation, denoted by points 9 and 12, respectively corresponding to the centers of the motor drive shaft and the wiper supporting rockshaft, when these centers are correctly spaced. The two arms 10 and 16 are connected at their outer ends to a connecting rod R of a length such as to just equal the spacing between the pivot pins 21 and 20 when the shaft centers are spaced apart the correct, predetermined distance. When the spacing thereof is correct, drive arm 10 moves through an arcuate path B and crank arm 16 is driven through the desired arcuate path A. It will be noted that the angle between connecting rod R and crank arm 16 is the same at each end of the crank arm stroke, and that crank arm 16 has equal arcuate motion on opposite sides of a point M representing the position of crank arm 16 in its stroke when drive arm 10 is at the midpoint of its stroke.

If, however the drive shaft center is moved closer to the rockshaft center, as to point 9', representing a decrease $x$ in the spacing therebetween, it is seen that when the same connecting rod R is used to interconnect the drive and driven arms the driven arm 16 is at a point M' when the drive arm 10 is midway through its stroke, which point M' is not midway through the stroke of the driven arm. As a result, the driven arm moves through an arm A' of greater length than arc A even though the motor moves through the same arc B, as illustrated in broken lines in FIG. 16. This increase in arcuate travel of driven crank arm 16 is caused because, while arc A is reduced at one end by the shaded portion $d$, a much larger amount of travel, represented by the shaded portion $e$, is added on to the other end thereof. This increase in arcuate travel becomes more obvious on the relatively greater length of the wiper arm 17.

However, this increase in arcuate travel can be avoided by adjusting connecting rod R to a new length R', as illustrated in FIG. 17. To this end, the length of rod R is reduced by an amount which matches the change in spacing $x$ between the shaft centers, and it is seen from FIG. 17 that by so adjusting the length of the connecting rod to compensate for this change in spacing, crank arm 16 is restored to its correct angular relation to the drive arm 10 and the desired correct oscillation of the driven crank arm 16 is obtained even with mis-spacing of the pivot shaft centers.

It is important to note that mis-spacing of the pivot shaft centers not only results in an increase in travel of the driven arm, and consequently of the wiper blade, but also can readily result in complete mis-functioning of the wiper. This is illustrated in FIG. 18 which shows the result of spacing the drive shaft center 9 a distance $z$ closer to the center of the driven shaft center 12, without adjusting the length of connecting rod R. The area $f$ is subtracted from one end of the stroke of crank arm 16 while a much larger area $g$ is added to the other end thereof, increasing the stroke of the driven crank arm to a degree causing it to move into a dead center position relative to the connecting rod R whereby the transmission is completely locked up and will not function.

One form of connecting rod suitable for this purpose is illustrated in FIGS. 2–7 and comprises a connecting rod 22 of channelled cross-sectional form, such as normally comprises the entire connecting link. At one end rod 22 is formed with an opening 23, which can be cushioned, to receive a crank arm pivot pin 20, and at its other end rod 22 carries a clutch or latch device generally designated 24 which in turn carries a connecting bar 25. Bar 25 is formed to comprise an extension of rod 22 and carries at its outer end a connector member 26 having a flat bottom wall 27 formed with an eyelet portion 28 having an opening 29 therein, which can be cushioned, to receive a drive arm crank pin 21. Connector 26 has side walls 31 formed over bar 25 and crimped to peripheral grooves therein, as indicated at 32, whereby it is fixed to bar 25 for movement therewith.

In the embodiment of FIGS. 1–7, clutch 24 is in the form of a spring lock of somewhat U-shape, having an anchor portion 33 secured to the bottom wall of rod 22 between its opposite side walls 34, as by rivets 35, and normally diverging spring arms 36 projecting upwardly therefrom, the arms 36 having openings 37 therein for receiving the rod 25. When in their released position shown in FIGS. 2 and 4, arms 36 position themselves diagonally to the anchor portion and they thus firmly grip bar 25 and lock the same to arm 22. When pulled toward each other, they release bar 25 for movement relative to rod 22.

When the rod is pulled or pushed, one or another of the arms 36 is canted into a still firmer grip on bar 25.

To install this cleaner on vehicle 2, the wiper motor 6 and the pivot shaft assemblies are mounted at the points provided on the respective body members. Then, in order to establish the correct predetermined geometrical relation between drive arms 10 and crank arms 16 the wiper motor 6 is parked whereby drive arms 10 assume a predetermined angular position. The pivot shafts 12 also are rotated to a predetermined parked position, whereby crank arms 16 are caused to assume the correct predetermined parked position relative to the parked drive arms 10. To accomplish the correct parking of crank arms 16, each pivot shaft 12 is provided with positioning means comprising in the illustrated embodiment a notch 38 on drive burr 15. Then, using for example a positioning tool 39 having a lug 41 for engaging in the notch 38, each pivot shaft 12 is rotated until the positioning tool assumes a position adjacent windshield 1 corresponding to the parked position of wipers 18, as shown in FIG. 8, at which point crank arms 16 occupy the parking position for which they are designed.

Figure 19:
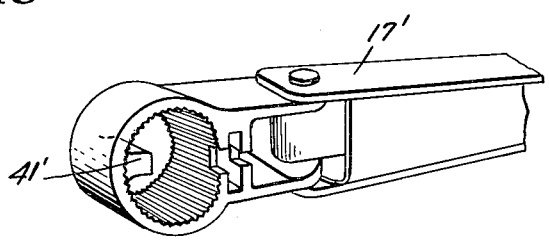
FIG. 19 is a detailed perspective, in fragment, of a wiper arm modified to incorporate the positioning lug.

While it is contemplated that a special tool will be provided for this purpose, obviously it is possible to take the wiper actuating arm 17' FIG. 19, for which the cleaner is designed and provide a lug 41' on the mounting head thereof similar to the lug 41 for engaging in the notch 38 in the same manner as described above with reference to tool 39, whereby simply moving the wiper arms to parked position will cause the crank arms 16 to assume the correct angular relation to the parked drive arms 10. In either case the positioning means correctly relate the pivot shaft crank arm and an attached wiper, so that the parked position of the wiper on the vehicle can be used as a reference for "parking" the crank arm.

At this point the arms carrying crank pins 20 and 21 are in the correct relative angular position as they should be when the blade is in its parked position. If there has been a deviation in the position of either the motor pivot or the wiper blade pivot so as to position them relative to each other at a spacing that is greater or less than it is supposed to be, the crank pins 20 and 21 will be correspondingly too far apart or too close together for them to fit on the ends of a one piece rigid connecting rod of a length that would properly fit them if they were in their proper spacing. It is obvious that when the crank pins are not in their correct spacing the connecting rod will have to be adjusted in its length in order for both of its ends to make cooperative engagement with the two crank pins. In other words, rod 25 is either extended or retracted as necessary to cause the connecting rod openings 23 and 29 to be alined with the pivot pins 20 and 21.

In making the adjustment, spring arms 36 are bent toward each other to release rod 25. In practice, the cleaner is furnished with the arms 36 held together in uncoupling position as by a keeper wire 43 engaging in slots 44 along the upper edge of the spring arms 36, wire 43 being headed as indicated at 45 or otherwise formed so as to hold the spring arms 36 in the freely sliding position thereof illustrated in FIGS. 5 and 6. The rod is adjusted to the correct length, as for example by assembling rod 22 on pivot pin 20 and extending part 26 until eyelet opening 29 is aligned with pivot pin 21, and then interconnecting the latter.

Then, when the connecting rod is positioned on the crank pins 20, 21, with the latter in their parked position, the spring arms 36 are released by simply removing keeper wire 43 whereby they spring apart and firmly lock the two transmission link parts in adjusted position. Thus, the rod is locked automatically in the correct length adjusted position as determined by the lineal spacing between the pivot pins on the particular installation. In this way, variation in the linear distance between the pivot pins, resulting from mis-spacing of the shaft centers, is compensated for automatically and the desired correct wiper travel is produced.

To reinforce spring arms 36 adjacent their points of flexure and to assist them in springing apart and staying apart a plate 46 can be positioned on top of bight portion 33 thereof, being held in position thereon as by rivets 35 and having its opposite ends curved as at 47 to nest within and firmly bear against the inner bottom corner portions of the spring arms 36.

Accordingly, a very simple arrangement is provided to automatically take up and compensate for any reasonable amount of deviation in the spacing of the drive and pivot shaft centers. The drive and crank arms are placed in the correct relative angular position and the length of the connecting rod is adjusted to the length necessary to match the spacing of the shaft centers, thereby interconnecting the drive and crank arms and maintaining their correct angular relation.

The member 26 can be rotated about the axis of bar 25, whereby the opposite end openings 23, 29 can be caused to lie in different planes which are not parallel to each other. This not only corrects for misalinement in this sense, but also permits use of the cleaner with a motor providing drive arms 10' lying in a plane at for example a right angle to that of drive arms 10, as when used for example in connection with an electric drive motor indicated at 6' in FIG. 9.

Figures 10, 11:
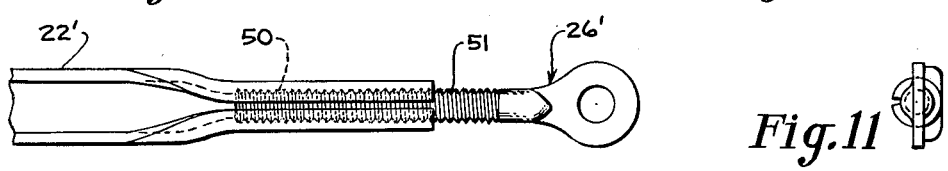
FIG. 10 is a fragmentary top plan view of a modified form of connecting link.
FIG. 11 is an end elevational view thereof.

Another form of connecting rod is illustrated in FIGS. 10 and 11, wherein the inner end of arm 22' is formed over and internally threaded, as indicated at 50, to receive the threaded shank 51 of a member 26' having an eyelet portion adapted for engagement with a drive arm pivot 21. Here again, the length of the connecting rod can be selectively varied for purposes of the invention, being accomplished in this embodiment by rotating member 26 relative to arm 22'.

When both ends of this connecting rod are assembled over their respective crank pins, all relative rotation between the connecting rod parts becomes impossible and hence any change in length due to running conditions is completely circumvented.

Another form of transmission link in accord with the invention is illustrated in FIGS. 12–15 wherein a channelled arm 22" telescopically receives the correspondingly channelled end 53 of a connecting member 26". The abutting bottom wall surfaces of members 22" and 53 are serrated, as indicated at 54, or otherwise formed to engage and interlock the two parts when they are held together. To selectively hold these parts against one another a headed pin 55 extends through a longitudinally elongated slot 56 in member 22" and through a cam 57 on member 53. A latch 58 is rotatable on pin 55 and is formed with opposed detents 60 adapted to ride on the surface of cam 57 which is arranged so that when latch 58 is in the position illustrated in the drawings, arm 22" and member 26" are locked together, whereas rotation of latch 58 ninety degrees about pin 55 to a position at right angles to that illustrated in the drawing will relieve the locking pressure and permit relative lengthwise adjustment thereof.

To releasably hold latch 58 in its locking position, it is formed with a generally U-shaped extension 61 comprising a handle part adapted to be received in a similarly U-shaped recess 62 on a resilient keeper element 63. Element 63 is carried by part 53 and held against rotation thereon as by a rivet 64 and locking lug 65 engaged in a slotted wall portion 66 thereof.

The foregoing examples are given by way of illustration only, and it is contemplated that the same can be varied and modified without departing from the invention. The foregoing examples are given by way of illustration only, Having fully disclosed and completely described this invention, and its mode of operation, what is claimed as new is as follows:

1. In a windshield cleaner, a pivot shaft adapted to mount an arm for oscillating a wiper blade across a surface to be wiped, a crank arm operatively related to said pivot shaft for movement therewith, a drive shaft, a drive arm operatively related to said drive shaft for movement therewith, connecting linkage adapted for pivotal connection adjacent one end thereof to said drive arm and adjacent the other end thereof to said crank arm, whereby rotation of said drive shaft is translated into oscillation of an attached wiper, one of said connecting linkage ends being movable relative to the other thereof lengthwise of said connecting linkage to compensate for variations in the spacing between said shafts and thereby enable the transmission of oscillatory movement within predetermined limits of amplitude, and means normally holding said one linkage end in lengthwise adjusted position, and said one linkage end being rotatable relative to the other about the lengthwise extent of said linkage while maintaining its lengthwise adjusted position.

2. In a windshield cleaner, a pivot shaft adapted to support a wiper for oscillation over a surface to be wiped, a crank arm connected to said pivot shaft for rotation therewith, a wiper motor having a drive shaft, a drive arm connected to said drive shaft for rotation therewith, connecting linkage pivotally connected adjacent one end thereof to said drive arm and adjacent the other end thereof to said crank arm, said connecting linkage having parts movable one relative to another lengthwise of said linkage to adjust the length of said linkage to match the spacing between said drive shaft and said pivot shaft and thereby maintain a predetermined angular relation between said arms with variation in the spacing between the centers of said shafts, and means normally holding said linkage parts against lengthwise relative movement thereby to maintain the adjusted length of said linkage, said linkage parts being rotatable one relative to another about the lengthwise extent of said linkage independently of any lengthwise adjustment thereof.

3. In a transmission mechanism for an oscillating rock shaft for windshield wiper support, employing a driving crank arm on a windshield wiper motor, a driven crank arm attached to said windshield wiper rockshaft, each of said arms having crank pins on their oscillating ends, and a connecting rod interconnecting said crank pins to transmit motion from said driving crank arm to said driven crank arm, said connecting rod including an extension at one end thereof movable lengthwise thereof for adjustably varying the length of said connecting rod to match the spacing between the centers of oscillation of said windshield wiper motor crank arm and said windshield wiper rockshaft crank arm so as to effect transmitted oscillation to said wiper rockshaft of substantially equal angular amounts each way from its position when said driving motor is in the middle of its travel, and means normally holding said extension in its lengthwise adjusted position, said extension be rotatable about the lengthwise extent of said connecting rod relative to the other end of said connecting rod independently of lengthwise adjustment of said extension.

4. In a transmission mechanism for an oscillating rockshaft for windshield wiper support, employing a driving crank arm, a driven crank arm attached to said windshield wiper rockshaft, each of said arms having crank pins on their oscillating ends, and a connecting rod interconnecting said crank pins to transmit motion from said driving crank arm to said driven crank arm, said connecting rod including an extension at one end thereof movable lengthwise thereof for adjustably varying the length of said connecting rod to match the spacing between the center of oscillation of said driving crank arm and said driven crank arm so as to effect transmission of angular movements to said rockshaft of an amplitude such that in their opposite end positions the angle between said driven crank arm and said connecting rod will be substantially the same, and means normally holding said extension against movement lengthwise of said connecting rod, said extension being rotatable relative to the opposite end of said connecting rod about the lengthwise extent thereof independently of such lengthwise movement.

5. In a windshield cleaner, a pivot shaft adapted to support an actuating arm for oscillating a wiper across a surface to be wiped, a crank arm connected to said pivot shaft for rotation therewith, a drive shaft, a drive arm connected to said drive shaft for rotation therewith, and connecting link means interconnecting said arms whereby rotary movement of said drive shaft is translated into oscillation of said pivot shaft, said connecting link means having a first part pivotally connected to one of said arms and a second part pivotally connected to the other of said arms, and spring latch means mounting said second part on said first part for lengthwise movement relative thereto and for rotary movement relative thereto independently of such lengthwise movement about an axis lying generally lengthwise thereof, said spring latch means being adapted normally to hold said parts against such relative lengthwise movement to comprise a rigid transmission link.

6. In a windshield cleaner, a pivot shaft adapted to support an actuating arm for oscillating a wiper surface across a surface to be wiped, a crank arm connected to said pivot shaft for rotation therewith, a drive shaft, a drive arm connected to said drive shaft for rotation therewith, and connecting link means interconnecting said arms whereby rotary movement of said drive shaft is translated into oscillation of said pivot shaft, said connecting link means having a first part pivotally connected to one of said arms and a second part pivotally connected to the other of said arms, said first part carrying a spring latch comprising a pair of normally diverging resilient arms, said arms being apertured and said second part having a shank portion fitting through said apertures, whereby said parts are adapted for relative lengthwise movement upon moving said arms toward each other and are held against relative lengthwise movement when said arms are released, and whereby said parts are adapted for relative rotary movement about the lengthwise extent of said connecting link means independently of such relative lengthwise movement.

7. In combination with a vehicle having a curved windshield comprising a relatively flat frontal portion joined to receding lateral portions through relatively sharply curved corner portions, a windshield cleaner designed to oscillate a wiper blade through a predetermined arc extending across said frontal portion and around one of said corner portions onto the associated one of said lateral portions, said arc being related to the pattern of curvature of said windshield to provide full arcuate wiping without scuffing, said cleaner comprising a rotatable pivot shaft mounted on said vehicle adjacent said windshield, an actuating arm and attached wiper blade mounted on said pivot shaft, a crank arm connected to said pivot shaft for rotation therewith, a drive having a rotatable drive shaft mounted on said vehicle, a drive arm connected to said drive shaft for rotation therewith, and a normally rigid transmission link pivotally connected adjacent one end to said drive arm and adjacent its other end to said crank arm, means providing a predetermined angular position of said drive arm when said drive is parked, and means providing a predetermined angular position of said actuating arm on said pivot shaft relative to said crank arm, thereby establishing a predetermined parked position of said crank arm when said wiper blade is parked, said link being length adjustable to interconnect said drive arm and said crank arm when in said parked positions even when the spacing between said shafts differs from that for which said cleaner is designed, thereby enabling said cleaner to provide said predetermined wiping arc with variation in such spacing.

8. In a vehicle, a windshield cleaner comprising a pivot shaft adapted to mount an arm for oscillating a wiper blade across a surface to be wiped, a crank arm operatively related to said pivot shaft for movement therewith, a drive shaft having a mounting on said vehicle independent of the pivot shaft mounting, a drive arm operatively related to said drive shaft for movement therewith, connecting linkage adapted for pivotal connection adjacent one end thereof to said drive arm and adjacent the other end thereof to said crank arm, whereby rotation of said drive shaft is translated into oscillation of an attached wiper, said one end of said connecting linkage being movable relative to said other end thereof lengthwise of said linkage to compensate for variations in the spacing between said shafts and thereby enable the transmission of oscillatory movement within predetermined limits of amplitude, means normally holding said ends of said linkage against such lengthwise relative movement, and said one end of said linkage being rotatable about the lengthwise extent of said linkage relative to said other end thereof while maintaining a predetermined length of said connecting linkage.

References Cited in the file of this patent

UNITED STATES PATENTS

| | | |
|---|---|---|
| 2,344,949 | Rappl | Mar. 28, 1944 |
| 2,476,427 | Melvin | July 19, 1949 |
| 2,493,552 | Sacchini | Jan. 3, 1950 |
| 2,696,674 | Tilghman | Dec. 14, 1954 |
| 2,716,252 | Mackie | Aug. 30, 1955 |
| 2,915,944 | Butts | Dec. 8, 1959 |

FOREIGN PATENTS

| | | |
|---|---|---|
| 457,774 | Italy | June 6, 1950 |

UNITED STATES PATENT OFFICE
CERTIFICATE OF CORRECTION

Patent No. 3,040,358 June 26, 1962

John R. Oishei

It is hereby certified that error appears in the above numbered patent requiring correction and that the said Letters Patent should read as corrected below.

Column 4, line 18, for "arm" read -- arc --.

Signed and sealed this 23rd day of October 1962.

(SEAL)
Attest:

ERNEST W. SWIDER
Attesting Officer

DAVID L. LADD
Commissioner of Patents